(12) United States Patent
Wu et al.

(10) Patent No.: US 11,625,167 B2
(45) Date of Patent: Apr. 11, 2023

(54) DYNAMIC MEMORY DEDUPLICATION TO INCREASE EFFECTIVE MEMORY CAPACITY

(71) Applicant: Intel Corporation, Santa Clara, CA (US)

(72) Inventors: Dujian Wu, Shanghai (CN); Yuping Yang, Shanghai (CN); Donggui Yin, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 17/255,189

(22) PCT Filed: Nov. 16, 2018

(86) PCT No.: PCT/CN2018/115961
§ 371 (c)(1),
(2) Date: Dec. 22, 2020

(87) PCT Pub. No.: WO2020/097925
PCT Pub. Date: May 22, 2020

(65) Prior Publication Data
US 2021/0271397 A1     Sep. 2, 2021

(51) Int. Cl.
*G06F 3/06*       (2006.01)
*G06F 12/02*      (2006.01)

(52) U.S. Cl.
CPC .......... *G06F 3/0608* (2013.01); *G06F 3/0652* (2013.01); *G06F 3/0673* (2013.01); *G06F 12/023* (2013.01)

(58) Field of Classification Search
None
See application file for complete search history.

(56) References Cited

U.S. PATENT DOCUMENTS

| | | | |
|---|---|---|---|
| 10,001,942 B1* | 6/2018 | Sharma | G06F 3/067 |
| 10,162,554 B2* | 12/2018 | Zheng | G06F 12/1009 |
| 10,754,696 B1* | 8/2020 | Chinnam | G06F 11/1453 |
| 2014/0114932 A1* | 4/2014 | Mallaiah | G06F 3/067 707/692 |
| 2017/0031945 A1* | 2/2017 | Sarah | G06F 16/1748 |
| 2018/0295367 A1* | 10/2018 | Mohammed | H04N 21/44209 |

FOREIGN PATENT DOCUMENTS

| | | |
|---|---|---|
| CN | 101079034 A | 11/2007 |
| CN | 107688436 A | 2/2018 |
| CN | 108073520 A | 5/2018 |
| CN | 108696671 A | 10/2018 |

OTHER PUBLICATIONS

International Search Report and Written Opinion for International Patent Application No. PCT/CN2018/115961, dated Aug. 23, 2019, 8 pages.

* cited by examiner

*Primary Examiner* — Charles Rones
*Assistant Examiner* — Ryan Dare
(74) *Attorney, Agent, or Firm* — Jordan IP Law, LLC (57) ABSTRACT

An embodiment of a semiconductor apparatus may include technology to determine if a threshold is met based on runtime memory usage, and enable foreground memory deduplication if the threshold is determined to be met. Other embodiments are disclosed and claimed.

25 Claims, 6 Drawing Sheets

| Linear Memory Space (Traditional Data Organization) |
|---|
| 0000 |
| 1234 |
| 0000 |
| 5678 |
| 5678 |
| 0000 |
| 0000 |

| Non-Linear Memory Space (Deduplication Style Data Organization) | |
|---|---|
| 0000 | 4 |
| 1234 | 1 |
| | |
| 5678 | 2 |
| | |
| | |
| | |

DYNAMIC MEMORY DEDUPLICATION TO INCREASE EFFECTIVE MEMORY CAPACITY

CROSS REFERENCE TO RELATED APPLICATIONS

The present application is a U.S. National Phase Patent Application, which claims the benefit of priority to International Patent Application No. PCT/CN2018/115961 filed on Nov. 16, 2018.

TECHNICAL FIELD

Embodiments generally relate to memory systems. More particularly, embodiments relate to dynamic memory deduplication to increase effective memory capacity.

BACKGROUND

Computer systems, such as servers, generally include external memory devices, such as dual-inline memory modules (DIMMs). Increased memory capacity and/or memory density generally involves higher costs. The capacity of the installed memory is generally determined at boot time.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory (NVM). Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

NVM may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Figure 1:
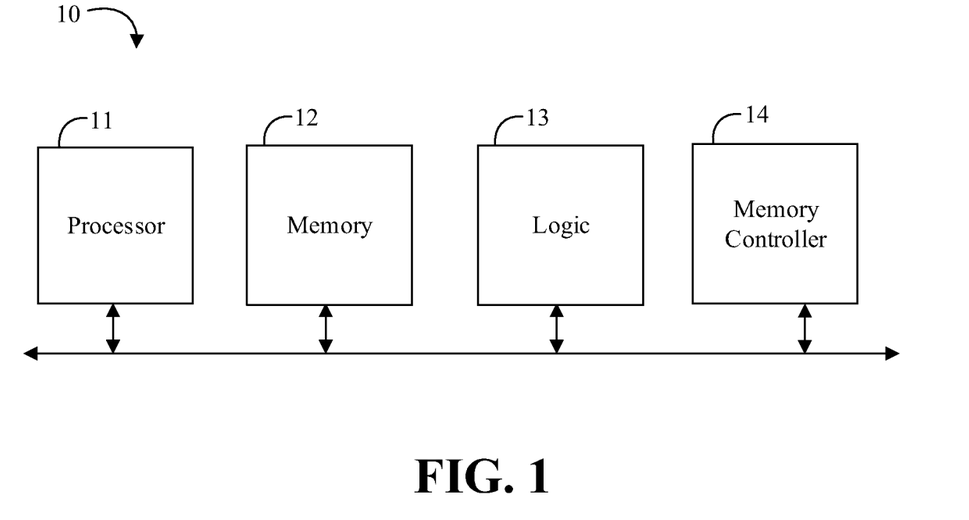
FIG. 1 is a block diagram of an example of an electronic processing system according to an embodiment.

Turning now to FIG. 1, an embodiment of a an electronic processing system 10 may include a processor 11, memory 12 communicatively coupled to the processor 11, a memory controller 14 communicatively coupled to the processor 11 and the memory 12, and logic 13 communicatively coupled to the processor 11 and the memory controller 14 to determine if a threshold is met based on runtime memory usage, and enable foreground memory deduplication if the threshold is determined to be met. In some embodiments, the logic 13 may be further configured to detect runtime memory loading, and determine if the threshold is met based on the detected runtime memory loading. For example, the logic 13 may also be configured to enable background memory deduplication at boot time, and run on linear memory space until foreground memory deduplication is enabled. In some embodiments, logic 13 may be further configured to disable foreground memory deduplication at boot time. For example, the logic 13 may also be configured to build non-linear memory space in the background when background memory deduplication is enabled, and/or to disable background memory deduplication after all linear memory space is converted to non-linear memory space. In some embodiments, the logic 13 may be located in, or co-located with, various components, including the processor 11 (e.g., on a same die).

Embodiments of each of the above processor 11, memory 12, logic 13, memory controller 14, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), a controller, a micro-controller, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, determining if a threshold is met based on runtime memory usage, enabling foreground memory deduplication if the threshold is determined to be met, etc.).

Figure 2:
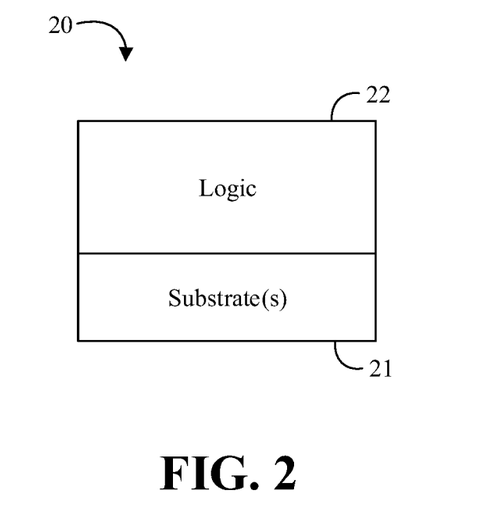
FIG. 2 is a block diagram of an example of a semiconductor apparatus according to an embodiment.

Turning now to FIG. 2, an embodiment of a semiconductor apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates may be configured to determine if a threshold is met based on runtime memory usage, and enable foreground memory deduplication if the threshold is determined to be met. In some embodiments, the logic 22 may be configured to detect runtime memory loading, and determine if the threshold is met based on the detected runtime memory loading. For example, the logic 22 may also be configured to enable background memory deduplication at boot time, and run on linear memory space until foreground memory deduplication is enabled. For example, the logic 22 may also be configured to disable foreground memory deduplication at boot time. In some embodiments, the logic 22 may be further configured to build non-linear memory space in the background when background memory deduplication is enabled and/or disable background memory deduplication after all linear memory space is converted to non-linear memory space. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
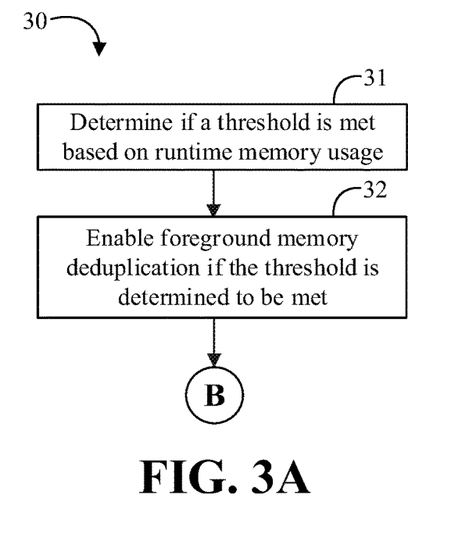
FIGS. 3A to 3C are flowcharts of an example of a method of controlling memory according to an embodiment.
Figure 3B:
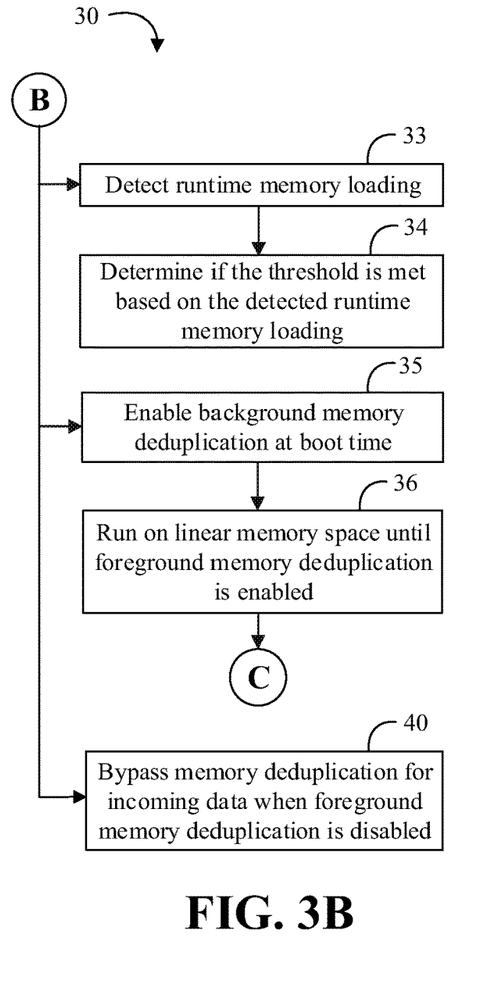
Figure 3C:
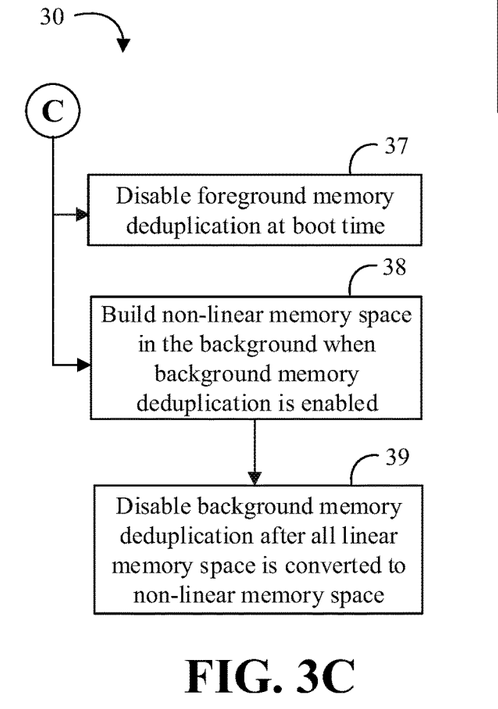

Turning now to FIGS. 3A to 3C, an embodiment of a method of controlling memory may include determining if a threshold is met based on runtime memory usage at block 31, and enabling foreground memory deduplication if the threshold is determined to be met at block 32. Some embodiments of the method 30 may include detecting runtime memory loading at block 33, and determining if the threshold is met based on the detected runtime memory loading at block 34. For example, the method 30 may also include enabling background memory deduplication at boot time at block 35, and running on linear memory space until foreground memory deduplication is enabled at block 36. For example, the method 30 may also include disabling foreground memory deduplication at boot time at block 37. Some embodiments of the method 30 may further include building non-linear memory space in the background when background memory deduplication is enabled at block 38, and/or disabling background memory deduplication after all linear memory space is converted to non-linear memory space at block 39. For example, the method 30 may also include bypassing memory deduplication for incoming data when foreground memory deduplication is disabled at block 40.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 21 to 27 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide an enhancement of memory deduplication technology to dynamically increase effective memory capacity. High memory capacity may involve high costs to deploy the memory on a system. For example, high density memory modules may involve more complex manufacturing technology, such as 3D stack dual-inline memory modules (3DS DIMM). Memory deduplication technology may address some problems associated with high capacity memory. For example, memory deduplication technology may add hardware logic between a processor core's last level cache (LLC) and a memory controller to detect any duplication data transferred between a processor (e.g., a CPU) and memory (e.g., DIMMs). The deduplication logic may allocate a private memory region in main memory space to make a set of index entries for duplicated data such that the memory controller may have only one copy of data in main memory space. In other words, different addresses associating with the same data are routed into one unique place in the main memory. With memory deduplication technology, a basic input/output system (BIOS) may indicate an available memory capacity to the OS which is greater than the actual physical capacity of the memory (e.g., with appropriate settings in the BIOS setup).

Figure 4:
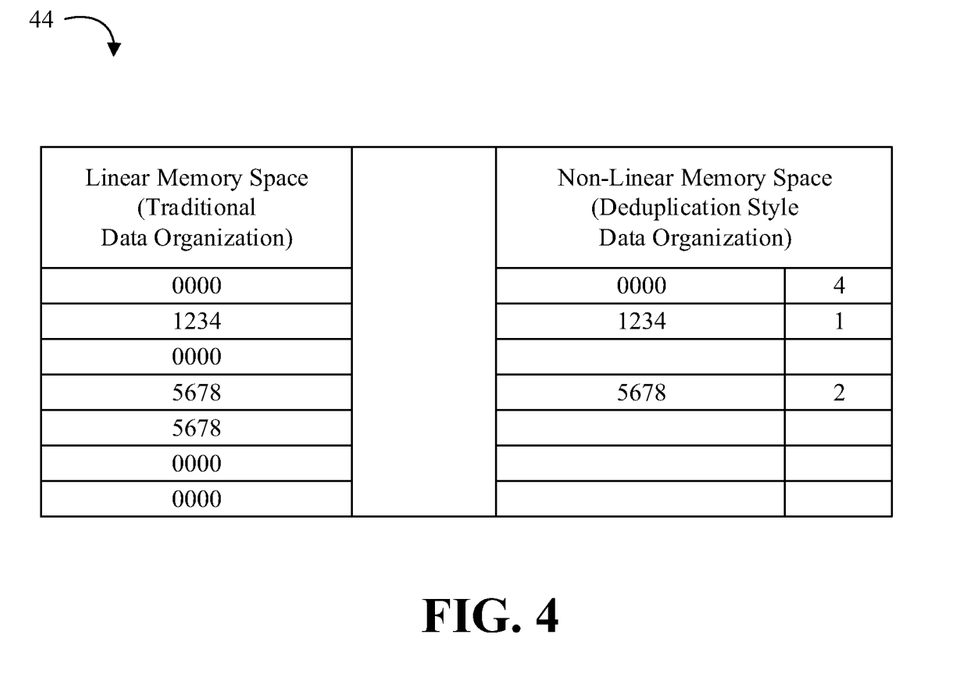
FIG. 4 is an illustrative diagram of an example of a table of memory entries according to an embodiment.

Turning now to FIG. 4, an embodiment of a table 44 of memory entries shows how data may be conventionally organized with linear memory space and how the same data may be organized with non-linear memory space utilizing memory deduplication technology. As illustrated in FIG. 4, the memory deduplication technology may provide more effective memory capacity.

In some systems, memory deduplication is enabled at a BIOS boot phase. The deduplication technology may initially decrease the data transaction performance due to the latency of deduplication logic, without regard to the current memory loading. In some server systems (e.g., a server for data storage), the system memory loading is not that high until it serves more customers. The initial customers running on the system may be subject to this latency even under low memory loading conditions. Some embodiments may advantageously provide flexible technology to dynamically enable deduplication in runtime according to memory loading. For example, some embodiments may enable memory deduplication only when the current memory loading is higher than a threshold. Advantageously, the system may gain both high data transaction performance and increased effective memory capacity.

In some embodiments, a system may initially run on linear memory space for data access with high performance. Meanwhile, non-linear memory space may be built gradually in background with deduplication logic and patrol logic. After system memory runs at a given threshold, the deduplication technology may be switched to run in the foreground. Some embodiments may advantageously provide high effective memory capacity with high memory access performance. Some embodiments may be particularly useful for multi-customer server systems where each customer has a light-weight touch to memory. Customers may gain high performance data access for a relatively long time until more customers need to be served.

Some computer systems may include one or more processor cores (e.g., multiple cores in a socket package for instruction execution) and each core may include its own LLC to cache data and instructions locally. The system may include a memory controller to process data transaction between the LCC and external memory. The memory controller may include pass though logic, deduplication logic, and multiplexer logic to select an appropriate data path between the pass through logic and the deduplication logic, depending on whether deduplication is enabled. When deduplication is disabled, the pass through logic is selected by the multiplexer and data may be directly passed to memory according to a system address. When deduplication is enabled, the deduplication logic will take effect. The deduplication logic may mainly be responsible for non-linear data space setup when writing, and data retrieval from memory when reading (e.g., which may involve some transaction latency). The memory controller may also include patrol logic which runs independently in the background after the system boots up. The patrol logic may orderly scan the whole physical memory space, and detect and recover memory error correction code (ECC) errors. The patrol logic may be able to read/check/write-back external memory without user interference. In some systems, the time cost to perform a whole physical memory scan may be a programmable patrol logic feature (e.g., 12 hours, 24 hours, etc.).

For some computer systems which include memory deduplication logic, deduplication may be enabled through a BIOS setting. For example, upon power up to boot system the BIOS may run on cache as ram (CAR) before external memory is ready. The BIOS may configure deduplication to claim a larger memory capacity than the system physical memory capacity. For example, the user/administrator may configure a deduplication data width, such as half of a cache line, one cache line, 1 KB, 4 KB etc., and specify a deduplication memory region if the user does not want to apply deduplication to the entire memory space. The memory controller may build a memory map according to the deduplication settings and enable the deduplication logic. The system memory space may then switch from CAR to external memory, and the system may then continue to BIOS boot and then boot the OS. The memory controller hardware logic may detect memory usage in runtime, and may trigger an event to the OS when low memory is detected. The OS memory management would process the low memory event. A problem with enabling the deduplication at boot time is that some users may encounter deduplication latency for deduplication that may not be needed when memory loading is low. Some embodiments may advantageously provide dynamic technology to enable deduplication in the foreground at runtime according to current memory loading.

Figure 5:
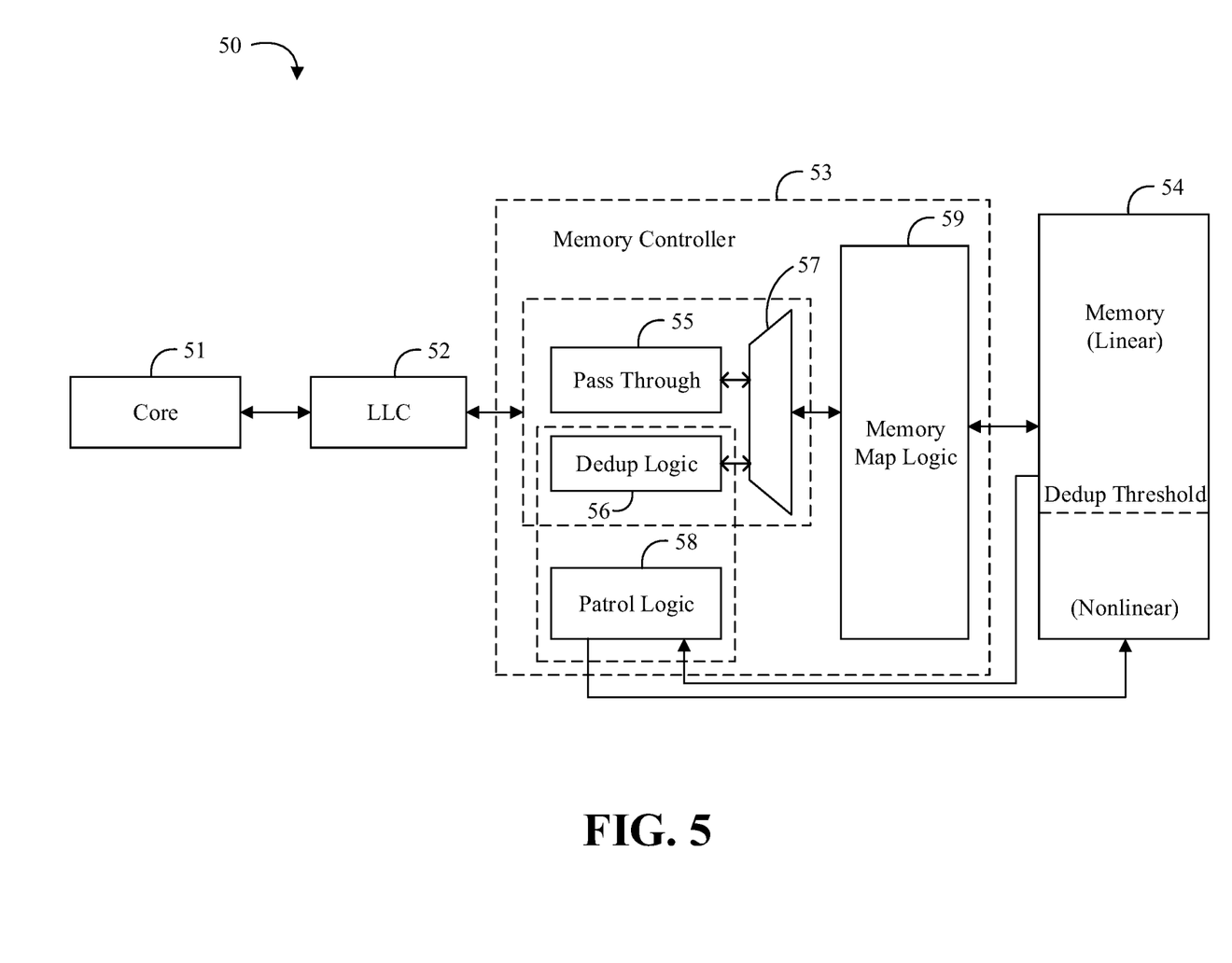
FIG. 5 is a block diagram of another example of an electronic processing system according to an embodiment.

Turning now to FIG. 5, an embodiment of an electronic processing system 50 may include one or more processor cores 51 (e.g., multiple cores in a socket package for instruction execution), and each core 51 may include its own LLC 52 to cache data and instructions locally. The system 50 may include a memory controller 53 to process data transactions between the LCC 52 and external memory 54. The memory controller 53 may include pass though logic 55, deduplication logic 56, and multiplexer logic 57 to select an appropriate data path between the pass through logic 55 and the deduplication logic 56, depending on whether deduplication is enabled. When deduplication is disabled, the pass through logic 55 is selected by the multiplexer 57, and data may be directly passed to memory 54 according to a system address. When deduplication is enabled, the deduplication logic 56 will take effect. The deduplication logic 56 may mainly be responsible for non-linear data space setup when writing, and data retrieval from memory 54 when reading (e.g., which may involve some transaction latency). The memory controller 53 may also include patrol logic 58 which runs independently in the background after the system boots up. The memory controller 53 may further include memory map logic 59 to provide address translation from a system address to a memory (e.g., DIMM) address.

In some embodiments, the patrol logic 58 may perform traditional patrol logic operations and may also access to the deduplication logic 56. For example, the patrol logic 58 may include its own independent deduplication logic or the patrol logic 58 may interface with the deduplication logic 56 of the memory controller 53. In some embodiments, the patrol logic 58 may utilize the deduplication logic 56 to build a non-linear data space for the memory 54 by writing data to the non-linear space in the background. For example, deduplication may independently run as part of the patrol logic 58 in the background at the first beginning of data transactions between the LCC 52 and the physical memory 54.

A deduplication threshold may be defined to distinguish between the linear and the non-linear memory space. After linear memory space is fully occupied and reaches the threshold, the deduplication logic 56 may be switched on from the background to the foreground for normal deduplication operation in non-linear space (e.g., and the pass through path of the pass through logic 55 may be turned off). Normal data access will no longer happen in linear memory space after deduplication is enabled in foreground. Meanwhile, the patrol logic 58 may continuously map the rest of data from linear space to non-linear space in the background. After all data in the linear space is migrated to non-linear space, the background deduplication operation in the patrol logic 58 may be turned off. As is apparent from the foregoing, when the threshold is met both background and foreground deduplication may be enabled for a period of time until the entire memory space is converted to non-linear memory space. A mutex may be utilized when deduplication runs in both background and foreground mode at the same time (e.g., a switch to make sure that only one component accesses the deduplication logic 56 at one time).

Figure 6:
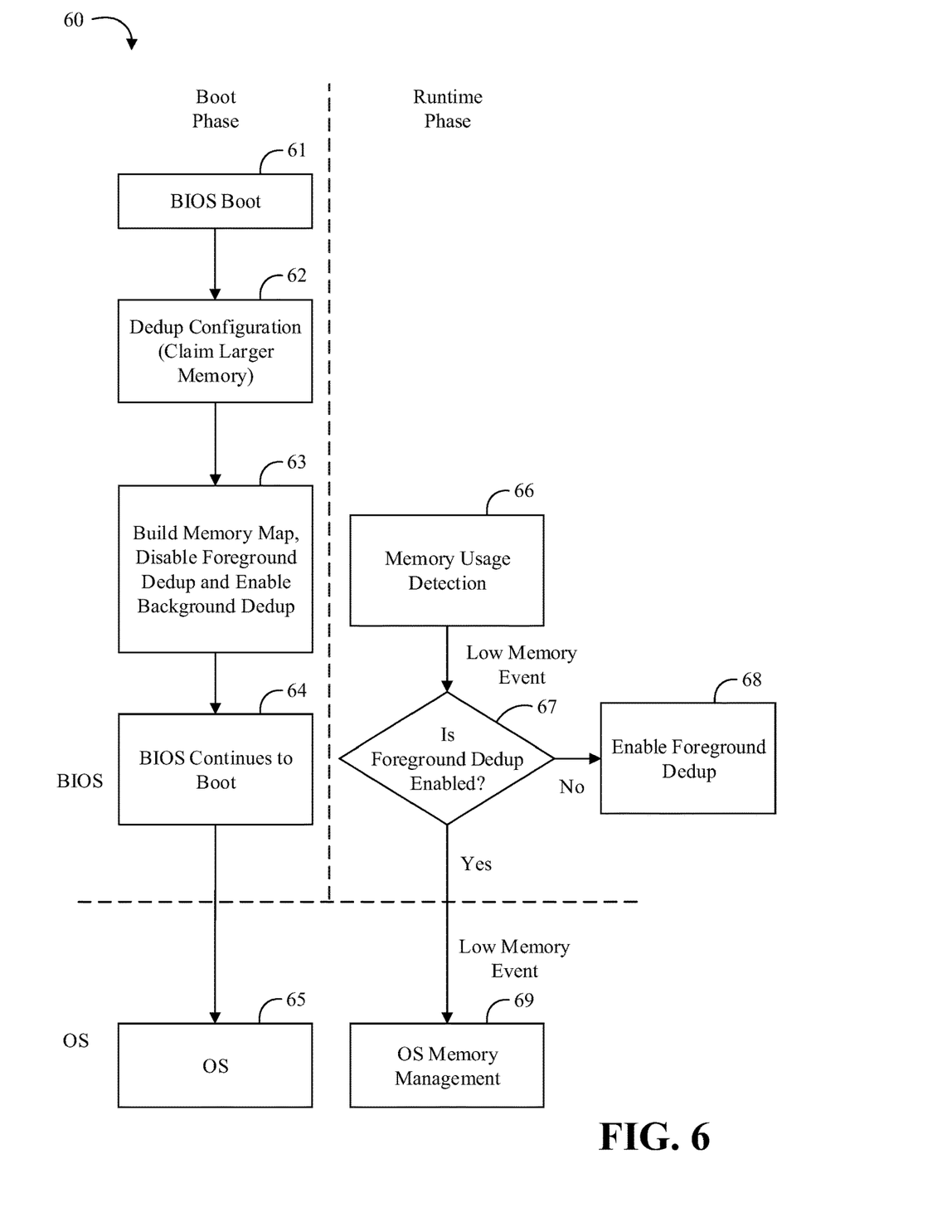
FIG. 6 is a flowchart of another example of a method of controlling memory according to an embodiment.

Turning now to FIG. 6, a method 60 of controlling memory may include a boot phase and a runtime phase. During the boot phase, the method 60 may include booting the BIOS at block 61 (e.g., in CAR) and configuring the memory based on deduplication settings in the BIOS at block 62 (e.g., indicating a larger memory capacity to the OS than the physical memory capacity). Still in the boot phase, the method 60 may then include building the memory map, disabling foreground deduplication, and enabling background deduplication at block 63, continuing the BIOS boot at block 64, and booting the OS at block 65 (e.g., transitioning to the runtime phase). Because foreground deduplication is disabled at block 63, maximum data transaction performance may be achieved without deduplication latency. During the runtime phase, the method 60 may include detecting memory usage for a low memory condition at block 66 (e.g., after the deduplication threshold is reached), triggering a low memory event is triggered. The method 60 may then include determining if foreground deduplication is enabled at block 67. If not, the method 60 may include enabling foreground deduplication at block 68 to increase the effective memory capacity. If not, the low memory event may be passed to the OS for OS memory management at block 69 (e.g., an alarm may be triggered to the OS to indicate that the system memory is running low).

Figure 7:
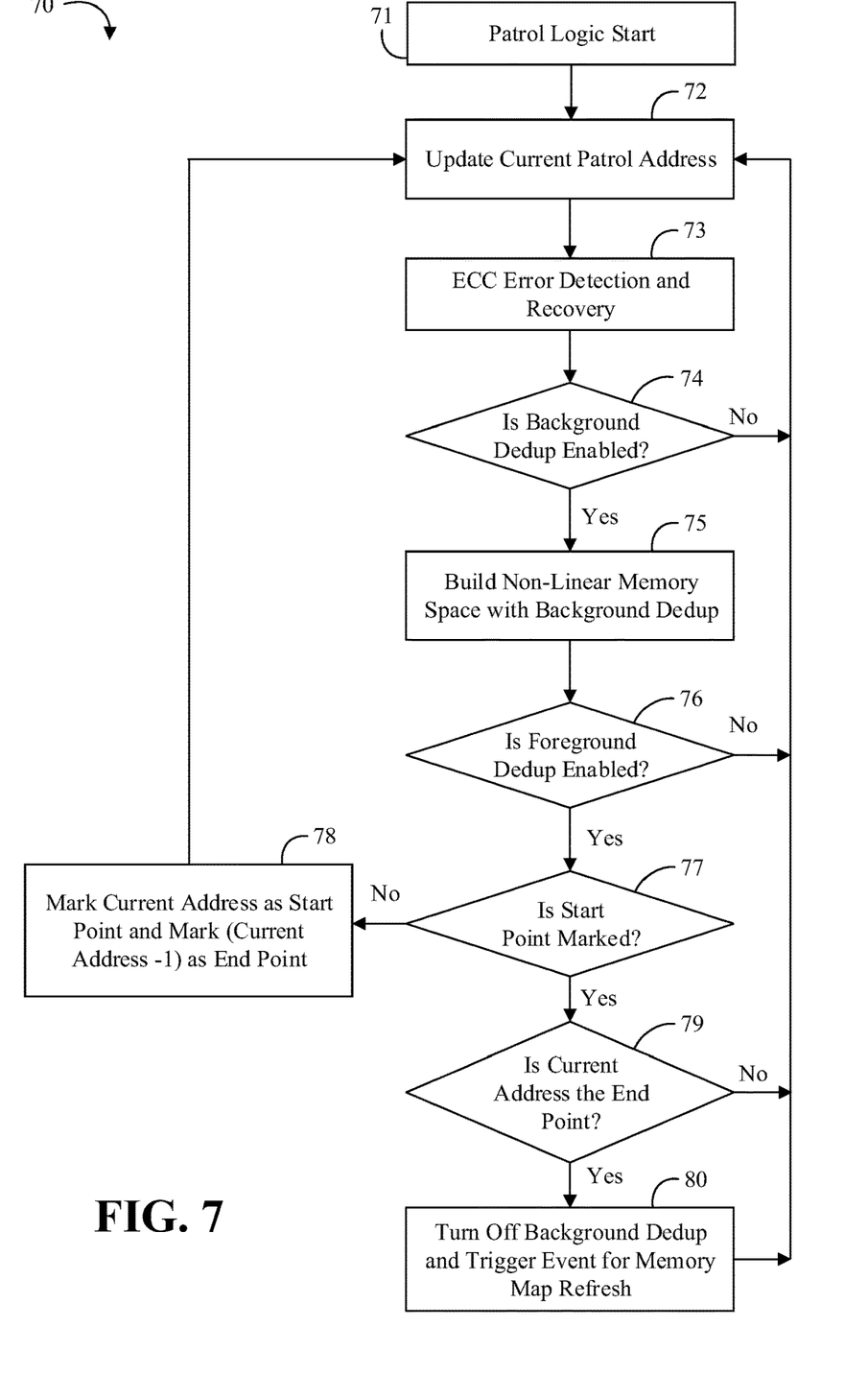
FIG. 7 is a flowchart of another example of a method of controlling memory according to an embodiment.

Turning now to FIG. 7, an embodiment of a method 70 of controlling memory may include starting the patrol logic at block 71 (e.g., patrol logic is enabled and starts at a BIOS boot phase). The method 70 may then include updating the current patrol address at block 72. For example, the patrol logic may orderly scan the whole physical memory for ECC detection and correction by updating the current patrol address, which is different and independent from system memory addresses and owned locally by patrol logic. The method 70 may then include performing ECC error detection and recovery at block 73. For example, the patrol logic may check memory data health by ECC detection and recovers the memory data if an ECC error is detected (e.g., conventional patrol logic functions may run repeatedly until system shutdown). The method 70 may then proceed to determining if background deduplication is enabled at block 74 and, if not, loop back to block 72 to update the current patrol address. For example, background deduplication may be enabled after the system starts to boot (block 63 in FIG. 6), and may be disabled after non-linear memory space is completely built (block 80 below). If background deduplication is enabled at block 74, the method 70 may include building non-linear memory space with background deduplication logic at block 75. For example, the patrol logic may build non-linear memory space in the background by scanning linear space over and over again. Note that the patrol logic may be the only agent to access the non-linear space, and normal data reads or writes happen in the linear space until foreground deduplication is enabled.

The method 70 may then proceed to determining if foreground deduplication is enabled at block 76 and, if not, loop back to block 72 to update the current patrol address. For example, foreground deduplication may become enabled when a deduplication threshold is reached (e.g., block 68 in FIG. 6). If foreground deduplication is enabled at block 76, the patrol logic may build non-linear space one more time with the current linear space snapshot. Normal data transactions may be switched from linear space to non-linear space, after which the patrol logic may be the only agent to access the linear space. The method 70 may include determining if a start point is marked at block 77 and, if not, marking the current patrol address as the start point and marking (current patrol address—1) as an end point to end background deduplication at block 78 and then looping back to block 72. If the start point is marked at block 77, the method 70 may include determining if the current address matches the end point at block 79 and, if not, looping back to block 72 to continue background deduplication on next address until the end point is reached. When the end point is reached at block 79, the method 70 may include turning off background deduplication and triggering an event to refresh the memory map at block 80. After background deduplication is disabled and the memory map is refreshed, both deduplication and the patrol logic may be downgraded and proceed like conventional patrol logic. Advantageously, users/customers may gain high performance data access before block 77 is reached and higher memory capacity thereafter.

ADDITIONAL NOTES AND EXAMPLES

Example 1 may include a semiconductor apparatus, comprising one or more substrates, and logic coupled to the one or more substrates, wherein the logic is at least partly implemented in one or more of configurable logic and fixed-functionality hardware logic, the logic coupled to the one or more substrates to determine if a threshold is met based on runtime memory usage, and enable foreground memory deduplication if the threshold is determined to be met.

Example 2 may include the apparatus of Example 1, wherein the logic is further to detect runtime memory loading, and determine if the threshold is met based on the detected runtime memory loading.

Example 3 may include the apparatus of Example 1, wherein the logic is further to enable background memory deduplication at boot time, and run on linear memory space until foreground memory deduplication is enabled.

Example 4 may include the apparatus of any of Examples 1 to 3, wherein the logic is further to disable foreground memory deduplication at boot time.

Example 5 may include the apparatus of any of Examples 1 to 3, wherein the logic is further to build non-linear memory space in the background when background memory deduplication is enabled.

Example 6 may include the apparatus of Example 5, wherein the logic is further to disable background memory deduplication after all linear memory space is converted to non-linear memory space.

Example 7 may include the apparatus of any of Examples 1 to 3, wherein the logic coupled to the one or more substrates includes transistor channel regions that are positioned within the one or more substrates.

Example 8 may include an electronic processing system, comprising a processor, memory communicatively coupled to the processor, a memory controller communicatively coupled to the processor and the memory, and logic communicatively coupled to the processor and the memory controller to determine if a threshold is met based on runtime memory usage, and enable foreground memory deduplication if the threshold is determined to be met.

Example 9 may include the system of Example 8, wherein the logic is further to detect runtime memory loading, and determine if the threshold is met based on the detected runtime memory loading.

Example 10 may include the system of Example 8, wherein the logic is further to enable background memory deduplication at boot time, and run on linear memory space until foreground memory deduplication is enabled.

Example 11 may include the system of any of Examples 8 to 10, wherein the logic is further to disable foreground memory deduplication at boot time.

Example 12 may include the system of any of Examples 8 to 10, wherein the logic is further to build non-linear memory space in the background when background memory deduplication is enabled.

Example 13 may include the system of Example 12, wherein the logic is further to disable background memory deduplication after all linear memory space is converted to non-linear memory space.

Example 14 may include a method of controlling memory, comprising determining if a threshold is met based on runtime memory usage, and enabling foreground memory deduplication if the threshold is determined to be met.

Example 15 may include the method of Example 14, further comprising detecting runtime memory loading, and determining if the threshold is met based on the detected runtime memory loading.

Example 16 may include the method of Example 14, further comprising enabling background memory deduplication at boot time, and running on linear memory space until foreground memory deduplication is enabled.

Example 17 may include the method of any of Examples 14 to 16, further comprising disabling foreground memory deduplication at boot time.

Example 18 may include the method of any of Examples 14 to 16, further comprising building non-linear memory space in the background when background memory deduplication is enabled.

Example 19 may include the method of Example 18, further comprising disabling background memory deduplication after all linear memory space is converted to non-linear memory space.

Example 20 may include the method of any of Examples 14 to 16, further comprising bypassing memory deduplication for incoming data when foreground memory deduplication is disabled.

Example 21 may include at least one computer readable storage medium, comprising a set of instructions, which when executed by a computing device, cause the computing device to determine if a threshold is met based on runtime memory usage, and enable foreground memory deduplication if the threshold is determined to be met.

Example 22 may include the at least one computer readable storage medium of Example 21, comprising a further set of instructions, which when executed by the computing device, cause the computing device to detect runtime memory loading, and determine if the threshold is met based on the detected runtime memory loading.

Example 23 may include the at least one computer readable storage medium of Example 21, comprising a further set of instructions, which when executed by the computing device, cause the computing device to enable background memory deduplication at boot time, and run on linear memory space until foreground memory deduplication is enabled.

Example 24 may include the at least one computer readable storage medium of any of Examples 21 to 23, comprising a further set of instructions, which when executed by the computing device, cause the computing device to disable foreground memory deduplication at boot time.

Example 25 may include the at least one computer readable storage medium of any of Examples 21 to 23, comprising a further set of instructions, which when executed by the computing device, cause the computing device to build non-linear memory space in the background when background memory deduplication is enabled.

Example 26 may include the at least one computer readable storage medium of Example 25, comprising a further set of instructions, which when executed by the computing device, cause the computing device to disable background memory deduplication after all linear memory space is converted to non-linear memory space.

Example 27 may include the at least one computer readable storage medium of any of Examples 21 to 23, comprising a further set of instructions, which when executed by the computing device, cause the computing device to bypass memory deduplication for incoming data when foreground memory deduplication is disabled.

Example 28 may include a memory controller apparatus, comprising means for determining if a threshold is met based on runtime memory usage, and means for enabling foreground memory deduplication if the threshold is determined to be met.

Example 29 may include the apparatus of Example 28, further comprising means for detecting runtime memory loading, and means for determining if the threshold is met based on the detected runtime memory loading.

Example 30 may include the apparatus of Example 28, further comprising means for enabling background memory deduplication at boot time, and means for running on linear memory space until foreground memory deduplication is enabled.

Example 31 may include the apparatus of any of Examples 28 to 30, further comprising means for disabling foreground memory deduplication at boot time.

Example 32 may include the apparatus of any of Examples 28 to 30, further comprising means for building non-linear memory space in the background when background memory deduplication is enabled.

Example 33 may include the apparatus of Example 32, further comprising means for disabling background memory deduplication after all linear memory space is converted to non-linear memory space.

Example 34 may include the apparatus of any of Examples 28 to 30, further comprising means for bypassing memory deduplication for incoming data when foreground memory deduplication is disabled.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus, comprising:
   one or more substrates; and
   logic coupled to the one or more substrates, wherein the logic is at least partly implemented in one or more of configurable logic and fixed-functionality hardware logic, the logic coupled to the one or more substrates to:
   determine if runtime memory loading exceeds a threshold;
   enable foreground memory deduplication if the threshold is determined to be met based on the runtime memory loading;
   enable background memory deduplication at boot time; and
   run on linear memory space until foreground memory deduplication is enabled.

2. The apparatus of claim 1, wherein the logic is further to:
   detect runtime memory loading; and
   determine if the threshold is met based on the detected runtime memory loading.

3. The apparatus of claim 1, wherein the logic is further to:
   disable foreground memory deduplication at boot time.

4. The apparatus of claim 1, wherein the logic is further to:
   build non-linear memory space in the background when background memory deduplication is enabled.

5. The apparatus of claim 4, wherein the logic is further to:
   disable background memory deduplication after all linear memory space is converted to non-linear memory space.

6. The apparatus of claim 1, wherein the logic coupled to the one or more substrates includes transistor channel regions that are positioned within the one or more substrates.

7. An electronic processing system, comprising:
   a processor;
   memory communicatively coupled to the processor;
   a memory controller communicatively coupled to the processor and the memory; and
   logic communicatively coupled to the processor and the memory controller to:
   determine if runtime memory loading exceeds a threshold;
   enable foreground memory deduplication if the threshold is determined to be met based on the runtime memory loading; and
   disable foreground memory deduplication at boot time.

8. The system of claim 7, wherein the logic is further to:
detect runtime memory loading; and
determine if the threshold is met based on the detected runtime memory loading.

9. The system of claim 7, wherein the logic is further to:
enable background memory deduplication at boot time; and
run on linear memory space until foreground memory deduplication is enabled.

10. The system of claim 7, wherein the logic is further to:
build non-linear memory space in the background when background memory deduplication is enabled.

11. The system of claim 10, wherein the logic is further to:
disable background memory deduplication after all linear memory space is converted to non-linear memory space.

12. A method comprising:
determining if runtime memory loading exceeds a threshold;
enabling foreground memory deduplication if the threshold is determined to be met based on the runtime memory loading; and
building non-linear memory space in the background when background memory deduplication is enabled.

13. The method of claim 12, further comprising:
detecting runtime memory loading; and
determining if the threshold is met based on the detected runtime memory loading.

14. The method of claim 12, further comprising:
enabling background memory deduplication at boot time; and
running on linear memory space until foreground memory deduplication is enabled.

15. The method of claim 12, further comprising:
disabling foreground memory deduplication at boot time.

16. The method of claim 12, further comprising:
disabling background memory deduplication after all linear memory space is converted to non-linear memory space.

17. The method of claim 12, further comprising:
bypassing memory deduplication for incoming data when foreground memory deduplication is disabled.

18. A semiconductor apparatus, comprising:
one or more substrates; and
logic coupled to the one or more substrates, wherein the logic is at least partly implemented in one or more of configurable logic and fixed-functionality hardware logic,
the logic coupled to the one or more substrates to:
determine if runtime memory loading exceeds a threshold;
enable foreground memory deduplication if the threshold is determined to be met based on the runtime memory loading; and
disable foreground memory deduplication at boot time.

19. The apparatus of claim 18, wherein the logic is further to:
detect runtime memory loading; and
determine if the threshold is met based on the detected runtime memory loading.

20. The apparatus of claim 18, wherein the logic is further to:
build non-linear memory space in the background when background memory deduplication is enabled.

21. The apparatus of claim 20, wherein the logic is further to:
disable background memory deduplication after all linear memory space is converted to non-linear memory space.

22. A semiconductor apparatus, comprising:
one or more substrates; and
logic coupled to the one or more substrates, wherein the logic is at least partly implemented in one or more of configurable logic and fixed-functionality hardware logic, the logic coupled to the one or more substrates to:
determine if runtime memory loading exceeds a threshold;
enable foreground memory deduplication if the threshold is determined to be met based on the runtime memory loading; and
build non-linear memory space in the background when background memory deduplication is enabled.

23. The apparatus of claim 22, wherein the logic is further to:
detect runtime memory loading; and
determine if the threshold is met based on the detected runtime memory loading.

24. The apparatus of claim 22, wherein the logic is further to:
disable background memory deduplication after all linear memory space is converted to non-linear memory space.

25. The apparatus of claim 22, wherein the logic is further to:
disable foreground memory deduplication at boot time;
enable background memory deduplication at boot time; and
run on linear memory space until foreground memory deduplication is enabled.

* * * * *